United States Patent Office 3,726,668
Patented Apr. 10, 1973

3,726,668
WELDING FILLING MATERIAL
Anton Bäumel, Lank, Niederrhein, Germany, assignor to Gebr. Bohler & Co. A.G., Kapfenberg, Austria
No Drawing. Filed Nov. 30, 1970, Ser. No. 93,877
Claims priority, application Germany, Nov. 29, 1969,
P 19 60 032.9
Int. Cl. C22c 39/54
U.S. Cl. 75—125                 7 Claims

ABSTRACT OF THE DISCLOSURE

The filler material comprises metallic constituents and carbon and is of 0.001–0.2% carbon, 0.1–5.0% silicon, 0.25–10.0% manganese, 15.0–25.0% chromium, 3.5–6.0% molybdenum, 8.0–30.0% nickel, 0.01–3.0% copper, 0.1–0.35% nitrogen, related to the total weight of the metallic constituents and carbon, balance iron and inevitable impurities.

---

This invention relates to a welding filler material for use in providing fully austenitic surface weld layers or welded joints which are insusceptible to hot cracking on predominantly austenitic base materials, particularly chromium-nickel steels.

It is known that austenitic chromium-nickel steels and chromium-nickel-molybdenum steels are highly susceptible to hot cracking as they are welded. To eliminate this disadvantage, the welding electrodes used in welding such steels and in depositing such welds result in a weld which differs from the base material by the presence of a delta-ferrite content of about 3–15% to oppose the formation of hot cracks. This has the great disadvantage, however, that the strong tendency of delta ferrite to decompose at elevated temperatures reduces the resistance to corrosion. Particularly in chemical equipment made of austenitic chromium-nickel steels, there is often a preferential corrosion of the seam welds so that these seams must often be rewelded when it is desired to extend the service life of the equipment. Besides, the toughness of the weld metal is also considerably reduced under the action of heat, which is particularly applied when the weld is deposited in a plurality of layers.

Compared to the prior art, the invention affords an important advantage because it discloses a welding filler material which surprisingly results in a fully austenitic weld that is entirely free of delta ferrite but does not involve the feared formation of hot cracks.

The welding filler material provided by the invention for use in providing fully austenitic surface weld layers or welded joints which are insusceptible to hot cracking on predominantly austenitic base materials, particularly chromium-nickel steels, is characterized in that it contains, related to the weight of the metallic constituents and of any carbon which is present, 0.001–0.2% C, preferably 0.001–0.1% C
0.1–5.0% Si, preferably 0.1–2.0% Si
0.25–10.0% Mn, preferably 0.25–5.0% Mn
15.0–25.0% Cr, preferably 15.0–20.0% Cr
3.5–6.0% Mo, preferably 3.5–5.0% Mo
8.0–30.0% Ni, preferably 10.0–16.0% Ni
0.01–3.0% Cu, preferably 0.01–1.5% Cu
0.1–0.35% N, preferably 0.1–0.2% N, balance Fe and inevitable impurities.

As to the impurities, the requirements for austenitic welding filler materials should be met so that the contents of phosphorus and sulfur should not exceed 0.025% and 0.020%, respectively.

The welding material in accordance with the invention may be provided in various forms, e.g., as a bare wire or bare strip or in a covered electrode or a tubular wire.

If the material consists of a bare wire or strip, the material will be an alloy having the stated composition and will be intended for use in a tungsten-inert gas (TIG) process, a metal-inert gas (MIG) process or an submerged-arc process.

If the material is contained in a covered electrode, the same may comprise a preferably calcium-base covering around a core wire having the stated composition. The covering will then contain in addition to the usual binders, in most cases silicate binders, and small amounts of plasticizers also slag-forming constituents, particularly 20–60% alkaline earth metal carbonate(s), 10–50% of one or more fluorides, preferably $CaF_2$, up to about 10% $TiO_2$ and up to about 20% deoxidizer, such as ferrosilicon, ferromanganese or the like.

Part of the alloying constituents may be contained in the covering rather than in the core wire so that the composition of the core wire will be altered accordingly.

If the electrode consists of a tubular wire, the compositions of the core and of the metallic covering will be selected in such a manner that the composition according to the invention will be obtained. In this case, part of the alloying constituents are preferably contained in the core.

The invention will now be explained more fully with reference to some examples. Unless otherwise indicated, all percentages stated are by weight.

EXAMPLE 1

Sheet metal elements in a thickness of 20 millimeters were provided which consisted of the Steel X5 CrNiMo 17 13 (Material Number 4449 according to DIN 17007). This steel has an excellent resistance to corrosion also in contact with reducing fluids and fluids which contain chlorine ions. These sheet metal elements were joined by welding with the aid of the welding filler material 4447 provided for this purpose in accordance with Stahl-Eisen-Werkstoffblatt 400–60 and composed of 0.048% C, 0.64% Si, 0.94% Mn, 17.26% Cr, 4.61% Mo, 13.45% Ni, 0.029% N, and less than 0.020% of each of phosphorus and sulfur, balance Fe, and with the welding filler material according to the invention composed of 0.033% C, 0.45% Si, 1.31% Mn, 17.14% Cr, 4.3% Mo, 13.59% Ni, 0.03% Cu and 0.15% N, balance Fe. In both cases, welding was carried out by the TIG process using argon as an inert gas and using the filler material in the form of a bare wire 2.5 millimeters in diameter. In another test, covered electrodes were used, which comprised a core wire having the same composition as the above-described bare wire according to the invention and a calcium-base covering comprising a mixture of 45% $CaCO_3$, 35% $CaF_2$, 5% $TiO_2$, 7% ferrosilicon (40% Si), 5% ferromanganese (affiné) and 3% plasticizer, with an addition of waterglass to provide the consistency required for extruding.

(1) Weld A (obtained from bare wire 4447)

(a) Notch at right angles to the plane of the weld: 4.7, 4.4, 4.4—kg.-m./cm.$^2$.

(b) Notch parallel to plane of the weld: 5.6, 5.8, 5.3—kg.-m./cm.$^2$.

(2) Weld B (obtained from the bare wire according to the invention)

(a) Notch at right angles to the plane of the weld: 15.0, 14.0, 15.6—kg.-m./cm.$^2$.

(b) Notch parallel to the plane of the weld: 13.4, 14.8, 15.0—kg.-m./cm.$^2$.

(3) Weld C (obtained from covered electrode according to the invention)

(a) Notch at right angles to the plane of the weld: 16.0, 14.6, 17.4—kg.-m./cm.$^2$.

(b) Notch parallel to the plane of the weld: 17.2, 15.0, 16.3—kg.-m./cm.$^2$.

It was found that the welded joints made with the welding filler material according to the invention are highly superior not only in the notched-bar impact test but also when welded samples were subjected to the attack of boiling concentrated nitric acid for three periods of 48 hours. The samples obtained from (1) (weld obtained from Material No. 4447) exhibited a considerable and progressive removal of the weld because of ferrite content was selectively dissolved by the acid. The samples welded with the aid of the welding filler material according to the invention according to (2) and (3) did not reveal appreciable corrosion because the weld has a homogeneous austenitic structure.

EXAMPLE 2

A container which had been used as a reactor in the chemical industry and consisted of the base material X10 NiMoTi 18 10 (Material No. 4571) composed of 0.04% C, 0.64% Si, 0.82% Mn, 17.92% Cr, 2.47% Mo, 10.80% Ni, 0.21% Ti, balance iron, had strongly corroded portions due to a preferential attack adjacent to the seam welds, which had been made originally by the TIG process with the aid of a bare wire which is suitable for welding Material Number 4581. The corroded portions were removed by grinding and were repaired with the aid of a welding filler material according to the invention in the form of the covered electrode which has been described in the preceding example. The weld produced from said electrode was used to form an entirely new cover layer. The weld did not exhibit any hot cracks and had the following chemical composition: 0.042% C, 0.76% Si, 1.44% Mn, 17.05% Cr, 4.2% Mo, 13.46% Ni, 0.025% Cu, 0.13% N, balance Fe. When the container had been used under similar conditions for four months, it did not reveal any selective corrosion but confirmed the expectation that the seam welds have now the same resistance to corrosion as the base material so that the life of the container is multiplied.

EXAMPLE 3

A plurality of plates having dimensions of 300 x 450 x 30 millimeters and made from a high-strength, weldable fine-grained structural steel composed of 0.18% C, 0.37% Si, 1.44% Mn, 0.013% N, 0.17% V, 0.42% Ni, 0.28% Al, 0.009% P, 0.012% S, balance Fe, were provided by weld-surfacing with two highly corrosion-resisting layers in a submerged arc welding process with the aid of a filler strip having dimensions of 60 x 0.5 millimeters and composed of 0.03% C, 0.50% Si, 1.28% Mn, 17.22% Cr, 4.53% Mo, 14.30% Ni, 0.08% Cu, and 0.14% N$_2$. An agglomerated neutral flux was used in the process, which was carried out under the following conditions: 650 amperes, 30 volts, welding speed 10 centimeters per minute.

The weld in the second layer was composed of 0.037% C, 0.72% Si, 1.54% Mn, 17.1% Cr, 4.35% Mo, 14.2% Ni, 0.06% Cu, 0.13% N$_2$, balance Fe. Two plates were used for corrosion tests. Two additional plates were cut transversely to the seam weld into strips 10 millimeters wide. These strips were checked for hot cracks by the dye penetration method and by an inspection of metallographic polished sections. No hot cracks were detected. The corrosion tests did not reveal a reduction in tensile stress. The bond strength between the base material and the layer applied by weld-surfacing was determine by tensile tests, folding tests and bending tests. These tests did not result in any faults.

What is claimed is:

1. A welding filler material for use in providing fully austenitic welds which are insusceptible to hot cracking on an austenitic base material, said filler material comprising metallic constituents and carbon and composed of 0.001–0.2% carbon, 0.1–5.0% silicon, 0.25–10.0% manganese, 15.0–25.0% chromium, 3.5–6.0% molybdenum, 10.0–16.0% nickel, 0.01–1.5% copper, 0.1–0.35% nitrogen, related to the total weight of the metallic constituents and carbon, balance iron and inevitable impurities, with the content of phosphorus and sulfur not exceeding 0.025% and 0.020%, respectively.

2. A welding filler material as set forth in claim 1, which contains 0.001–0.1% carbon.

3. A welding filler material as set forth in claim 1, which contains 0.1–2.0% silicon.

4. A welding filler material as set forth in claim 1, which contains 0.25–5.0% manganese.

5. A welding filler material as set forth in claim 1, which contains 15.0–20.0% chromium.

6. A welding filler material as set forth in claim 1, which contains 3.5–5.0% molybdenum.

7. A welding filler material as set forth in claim 1, which contains 0.1–0.2% nitrogen.

References Cited

UNITED STATES PATENTS

| | | | |
|---|---|---|---|
| 2,200,208 | 5/1940 | Parsons | 75—125 |
| 2,528,638 | 11/1950 | Clarke | 75—125 |
| 2,750,282 | 6/1956 | Mott | 75—125 |

L. DEWAYNE RUTLEDGE, Primary Examiner

J. E. LEGRU, Assistant Examiner

U.S. Cl. X.R.

75—128 A, 128 C, 128 N, 128 W